though somewhat heavier hydrocarbons may be employed. Naphthas in the gasoline boiling range are particularly suitable. A typical petroleum naphtha is a mixture of hydrocarbons boiling in the range of about 100 to 400° F. Heavier or lighter fractions may be included. The light hydrocarbon is suitably a hydrocarbon which can be readily separated from a heavy residual oil by vaporization at moderate temperatures. Light hydrocarbons are introduced into the water dispersion of carbon in any suitable gas-liquid contact apparatus, for example, in pipe lines, in mixing vessels provided with agitators, and in spray contactors. Water and light hydrocarbon are separated, for example, in conventional gravity settlers. A clean interface is produced in the settler with most of the carbon transferred to the hydrocarbon layer. The clarified water is suitable for reuse in the process.

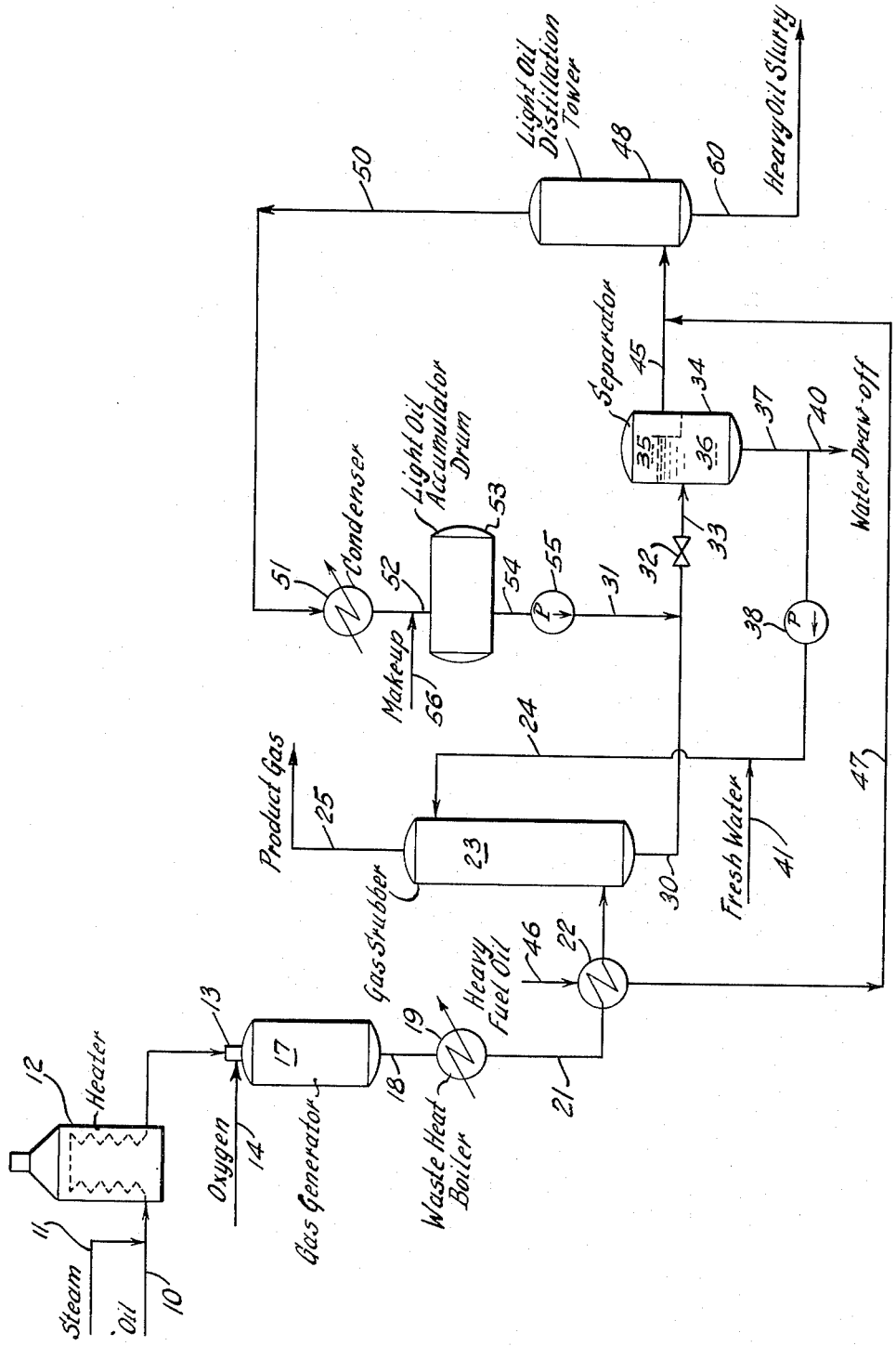

2,992,906
CARBON RECOVERY METHOD
Frank E. Guptill, Jr., Whittier, Calif., assignor to Texaco Inc., a corporation of Delaware
Filed May 29, 1958, Ser. No. 738,843
8 Claims. (Cl. 48—196)

This invention relates to a process for the production of carbon monoxide and hydrogen from fossil fuels by reaction with oxygen. In one of its more specific aspects it is directed to a method of separating carbonaceous solid entrained in the gaseous products of reaction of fossil fuels and oxygen wherein said products are scrubbed with water, carbonaceous solid is separated from the scrubbing water by contacting with a light liquid hydrocarbon, clarified water and a slurry of carbon in light hydrocarbon are separated, the light hydrocarbon slurry is contacted with a heavy hydrocarbon, and light hydrocarbon is separated by vaporization forming a slurry of carbon in heavy hydrocarbon.

The generation of carbon monoxide and hydrogen by the partial oxidation of fossil fuels is a highly economic method of producing these gases. In the partial oxidation process, a fossil fuel, for example, coal, petroleum oil, or natural gas, is reacted with an oxygen-containing gas in a closed, compact reaction zone at an autogenous temperature within the range of about 1800 to 3500° F. preferably about 2200 to 2800° F. Preheating the reactants is generally desirable. The reaction zone is free from packing and catalyst and has nearly minimum internal surface. The reaction zone is maintained at a pressure above about 100 pounds per square inch gauge and may be as high as about 600 pounds per square inch gauge. Steam may be introduced into the reaction zone to assist in the dispersion of the fuel into the reactor, to assist in control of the reaction temperature, and as a reactant to increase the relative amount of hydrogen produced. The product consists essentially of carbon monoxide and hydrogen and contains relatively small amounts of water vapor, carbon dioxide, and entrained carbonaceous solid. The carbonaceous solid is in the form of very fine carbon particles, and appears to contain some chemisorbed oxygen which renders the particles easily wet by water.

The amount of uncombined oxygen supplied to the reaction zone is limited so that near maximum yields of carbon monoxide and hydrogen are obtained. Air, oxygen-enriched air or substantially pure oxygen may be employed in the process. Oxygen of high purity may be readily obtained by the rectification of air. Commercial oxygen plants, capable of delivering large amounts of high purity oxygen, typically produce oxygen streams containing in excess of 95 mol percent oxygen, and oxygen of this purity is generally preferred.

Product gases issuing from the gas generation step contain a large amount of sensible heat. This heat may be employed to convert water to steam. For example, if the synthesis gas is to be passed to a process requiring additional steam, for example, a water gas shift process, steam may be generated by introducing water directly into the effluent gases from the gas generator. Where steam admixed with the synthesis gas stream is not desired, heat may be recovered from the gas generator effluent by passing the gases through heat exchangers or waste heat boilers. Steam for process or power use is advantageously produced in such waste heat boilers. Preheating of process streams, for example, fuel to the gas generation step, may be effected in heat exchangers. When the product gases are cooled by indirect heat exchange, it is preferred to cool the gases only to a temperature above the dew point at the prevailing pressure to avoid fouling of heat transfer surfaces occasioned by condensation of water and adhesion of entrained carbon.

The entrained carbon is effectively removed from the product gases by contacting the cooled synthesis gas with water in gas-liquid contact apparatus, for example, spray towers, bubble towers, baffle towers or packed towers. Cooling of the synthesis gas may also be effected in the scrubbing zone by vaporizing a part of the scrubbing water, by cooling the scrubbing water, or both. It is desirable to maintain the solids content of the water in the scrubbing zone less than about 2 percent solids and preferably about 1 percent solids for satisfactory pumpability. The solids content is controlled by withdrawing a portion of solids dispersion from the bottom of the scrubbing zone, removing the solids therefrom and returning clarified water to the top of the scrubbing zone. Since the amount of dispersion which must be processed for solids removal at a given carbon production rate varies inversely with the solids content of the dispersion, it is preferred to maintain the solids content of the dispersion withdrawn from the bottom of the scrubber at about 1 percent. However efficient washing may require higher liquid rates than the amount of liquid required to suspend the separated carbon, and so a portion of the solids dispersion may be recycled to provide sufficient scrubbing liquid. The temperature of the dispersion withdrawn from the scrubbing zone is advantageously maintained at a high temperature to facilitate succeeding process steps. The scrubbing temperature can, of course, be no higher than the boiling point of water at the prevailing pressure. A substantial temperature differential may be maintained in the scrubbing zone by introducing cooled scrubbing water at the top of the scrubbing zone so that the clean scrubbed gas is discharged at a relatively low temperature and corresponding low water vapor content. It is desirable to operate the scrubber at high pressure, that is, substantially the pressure of the gas generator with allowance for pressure drop through lines and heat transfer equipment. The use of high pressures makes possible the use of relatively high temperatures in the scrubbing zone, effects advantages in succeeding carbon separating steps, and delivers the product gas for use with a minimum of compression.

The separation of the carbon from the gaseous products of partial oxidation in the form of a carbon-water dispersion produces large volumes of water containing about one percent carbon. Economics and the avoidance of water pollution require that the carbon be separated from at least a major portion of the water to permit reuse of the water and recovery of the carbon in useful form. An advantageous method of separation is to transfer the carbon to an oil by intimately contacting the water dispersion with an oil effecting separation of clarified water and a slurry of carbon in oil. The clarified water layer may contain some residual solids or may be clear. It is to be understood that the term "clarified" as used herein is to be construed in its broadest sense to refer to water of reduced solids content. The clarified water is suitable for reuse in the process and the slurry of carbon in oil is suitable for use in the generation of additional gas or as furnace or boiler fuel. Hydrocarbons have a relatively high carrying capacity for carbonaceous solid as compared with water. Pumpable slurries of carbon in liquid hydrocarbon may be produced by contacting the water dispersion with an amount of oil at least five times the weight of dispersed carbon. It is preferred to contact the water dispersion with an amount of hydrocarbon within the range of about ten to thirty times the weight of the carbon contained in the dispersion.

Hydrocarbons suitable for the separation of carbon from water dispersions in accordance with this invention include liquid hydrocarbons, having gravities of 20° API and higher, for example, butanes, pentanes, hexanes, benzol, toluol, natural gasoline, gasoline, naphtha, gas oil, their mixtures and the like. Hydrocarbons having gravities lower than 20° API have been found unsuitable because the carbon-oil slurry formed does not separate from the water but forms an oil-water emulsion. Treatment with typical liquid emulsion breakers has been found ineffective in resolving emulsions formed with oils of lower gravity than 20° API. The stability of the emulsion formed is likely due to the small difference in density of the oil and water phases and the tendency of the oil to form an emulsion. The presence of carbon, which has a density of about 1.8 grams per cubic centimeter in oil, tends to increase the density of the oil phase; as a result, oils which would otherwise readily separate from water, may form stable emulsions when present as an oil-carbon slurry.

Contacting of the liquid hydrocarbon and water dispersion may be effected with a mixing valve, pump, orifice, nozzle, propeller mixer, or turbine mixer. It is preferred to contact the oil and water dispersion at about the temperature and pressure of the scrubbing zone. Higher pressure makes possible the use of lower boiling hydrocarbon oils. High temperature facilitates phase separation by reducing oil viscosity. Clarified water and slurry of carbon in oil are separated by passing the mixed stream to a phase separating zone, for example, a tank providing a relatively quiescent settling zone or a centrifugal separator. If a settling tank is employed, sufficient volume is provided to afford a residence time preferably of at least two minutes. Separation of the oil-carbon slurry from the clarified water may be accelerated by the addition of an emulsion breaker. Clarified water from the phase separator is returned to the scrubbing zone.

As pointed out above the slurry of carbon in hydrocarbon separated from the clarified carbon-water is useful as fuel for the generation of additional gas or as fuel for heating purposes. However, hydrocarbons of suitable gravity for separation from mixtures with carbon and water are relatively valuable and their use in such fuel mixtures is to be avoided. In accordance with the process of this invention, carbon from the light oil slurry is transferred to a heavy fuel oil slurry by contacting with a heavy fuel and the light oil is recovered for reuse by vaporization. Heavy fuel oils suitable for use in this process include, for example, heavy distillates, residual fuel oil, bunker fuel oil or No. 6 fuel oil. The light oil slurry and heavy fuel oil may be contacted in a mixing valve, pump, orifice, nozzle, propeller or turbine mixer, by passing together in turbulent flow through a transfer line or by contacting in a distillation tower. Advantageously the heavy fuel oil is heated to a temperature above the boiling point of the light oil before contacting therewith so that transfer of the carbon and vaporization of the light oil occur simultaneously upon mixing the light oil slurry and hot heavy fuel oil. Surprisingly, it is found that heavy fuel oil has a greater carrying capacity for carbon than have light hydrocarbons and transfer of the carbon to pumpable heavy fuel oil slurry may be made using an amount of heavy fuel oil less than the light oil in the light oil slurry. However, it is preferred to use an amount of heavy oil within the range of five to twenty times the weight of carbon in the light oil slurry.

The vaporized light hydrocarbon is separated from the heavy fuel oil-carbon slurry and cooled to recondense the light hydrocarbon liquid. The light hydrocarbon liquid is then recycled for use in contacting additional carbon-water dispersion. The heavy fuel oil-carbon is withdrawn for fuel use.

When ash-containing fossil fuels, for example, coal, are used for the production of carbon monoxide and hydrogen, it is generally desirable to separate at least a part of the ash from the reaction products. Removal of the ash increases the utility and value of the carbon which is separately recovered and facilitates the clarification of the carbon-containing scrubbing water. A large part of the ash is easily removed in a quench zone wherein the products are cooled by direct contact with water and the molten ash converted to a sand-like solid slag which settles to the bottom of the quench zone and may be withdrawn through lock hoppers. The quenched gas containing entrained carbon and fine slag is then contacted with water in a scrubbing zone to effect removal of substantially all of the solids from the gas forming a dispersion of solid in the scrubbing water. The scrubbing water dispersion is then passed to one or more settlers where the relatively coarse and dense slag particles are settled and the water containing dispersed carbon particles is withdrawn. The carbon-water dispersion is then contacted with oil as described above to effect clarification of the water and formation of an oil-carbon slurry.

An advantage of the process of this invention is that carbon is effectively and efficiently removed from synthesis gas.

Another advantage of the process of this invention is that the carbon formed in the manufacture of synthesis gas is separated as a slurry in heavy fuel oil useful in the generation of additional synthesis gas or as fuel for heating purposes.

Another advantage of this process is that heat contained in gas generation products is efficiently utilized.

Having set forth its general nature the invention will be best understood from the more detailed description hereinafter which refers to the accompanying drawing. Although the drawing illustrates one arrangement of apparatus in which the process of this invention may be practiced it is not intended to limit the invention to the particular apparatus or material described.

Bunker fuel oil in line 10 is admixed with steam from line 11 and the mixture passed through heater 12 to gas generator burner 13. Oxygen in line 14 is admixed with the steam-oil mixture in burner 13. The steam, oil, and oxygen react in gas generator 17 at an autogenous temperature of about 2800° F. and 300 pounds per square inch gauge to produce a synthesis gas comprising carbon monoxide and hydrogen. Additionally, the synthesis gas contains entrained carbon amounting to about 2 percent of the carbon content of the oil feed. Hot synthesis gas from generator 17 is withdrawn through line 18 and passed to waste heat boiler 19 where the synthesis gas is cooled by the generation of steam. The cooled synthesis gas is passed through line 21 and heat exchanger 22 to gas scrubber 23 where the synthesis gas and entrained carbon are contacted in countercurrent flow with scrubbing water introduced through line 24. Synthesis gas substantially free of entrained carbon is withdrawn through line 25 and discharged for utilization not shown.

Scrubbing water comprising about 1 percent dispersed carbon is withdrawn from scrubber 23 through line 30 at a temperature of about 275° F. The scrubbing water-carbon dispersion is contacted with light straight run gasoline from line 31 and the combined stream passed through mixing valve 32. A pressure drop of about 30 pounds per square inch across mixing valve 32 effects high turbulence and mixing of the water, carbon and gasoline. The mixture then passes through line 33 into separator 34. Two phases form in separator 34 comprising a gasoline-carbon phase 35 floating on a clarified water phase 36. Clarified water is withdrawn through line 37 and recycled to gas scrubber 23 through line 24 by pump 38. Blowdown water is withdrawn through line 40 as necessary to prevent the accumulation of water soluble impurities or the accumulation of condensate from the synthesis gas. Make-up water to compensate for losses or water withdrawn as blowdown is added as necessary through line 41.

Gasoline-carbon slurry from separator 34 is withdrawn through line 45. Heavy fuel oil in line 46 is heated to a temperature above the boiling point of light gasoline in heat exchanger 22 and passed through line 47 into admixture with the light gasoline in line 45. The mixed stream is then passed through line 45 to light oil distillation tower 48 where the gasoline is vaporized, the carbon transferred to the heavy fuel oil to form a slurry of carbon in heavy fuel oil. Gasoline vapor is withdrawn through line 50, cooled and condensed in condenser 51 and the condensed gasoline passed through line 52 to accumulator drum 53. Gasoline in accumulator drum 53 is withdrawn through line 54 and passed by pump 55 and line 31 into contact with additional water-carbon dispersion. Make-up gasoline to compensate for any gasoline lost from the system is added through line 56. A slurry of carbon in heavy fuel oil is withdrawn through line 60 for fuel use not shown.

*Example I*

Synthesis gas is produced by the partial oxidation of a bunker fuel oil at a temperature of 2600° F. and at 250 pounds per square inch gauge. In the generation of the synthesis gas, 2 percent of the carbon content of the fuel oil is unconverted to gaseous products and appears as entrained carbon in the product gas. The hot synthesis gas is cooled to 400° F. and steam is generated by passing the synthesis gas through a waste heat boiler. The cooled gas is scrubbed with water in a scrubber maintained at 248 pounds per square inch gauge. Scrubbing water containing 1 percent entrained carbon is withdrawn at a temperature of 265° F. The scrubbing water-carbon dispersion is contacted with liquid benzol at a combined temperature of 250° F. and at a rate of two gallons per pound of entrained carbon. The mixture of scrubbing water, carbon and benzol is thoroughly mixed by passing through a valve which discharges to a liquid separator. A slurry of carbon in benzol floats on top of the clarified water in the separator. Clarified water is withdrawn and returned to the gas scrubber. Benzol-carbon slurry is withdrawn and contacted with one-half its volume of bunker fuel oil having a gravity of 10° API preheated to a temperature of 400° F. The benzol is vaporized and the benzol vapor is separated from the resulting slurry of carbon in bunker fuel oil. The benzol vapor is condensed and recycled for further contact with carbon-containing scrubber water. The bunker fuel oil containing 12 percent carbon and having a gravity of 2.5° API and a heating value of 17,700 B.t.u.'s per pound is suitable for use as a fuel.

*Example II*

Synthesis gas is produced by reaction of a bunker fuel oil-carbon slurry produced as described hereinafter. The gas generator is operated at a temperature of 2700° F., a pressure of 350 pounds per square inch gauge and with an oxygen to carbon feed ratio of 0.856. The oil-carbon slurry comprises 24.2 pounds per hour of carbon suspended in 53.2 gallons per hour of oil and is charged to the gas generator with 250.2 pounds per hour of steam.

The raw synthesis gas produced contains entrained carbon produced at the rate of 24.2 pounds per hour. The raw synthesis gas product is quenched and scrubbed with water effecting removal of substantially all of the entrained carbon. Scrubbing water comprising a dispersion of 0.43 weight percent carbon is continuously withdrawn at a rate of 675 gallons per hour. The scrubbing water dispersion is contacted with a 63° API gasoline fraction having an ASTM distillation range of 84 to 392° F. at a rate of 105 gallons per hour effecting transfer of the carbon from the water to the gasoline. The suspension of carbon in gasoline formed floats on clarified water and the water is withdrawn and continuously recycled in contact with additional raw synthesis gas.

The gasoline-carbon suspension is then contacted with an 8.3° API bunker fuel oil having a viscosity of 172 Saybolt seconds Furol at 122° F. and a sulfur content of 1.56 weight percent. The bunker fuel oil is supplied at a rate of 53.2 gallons per hour. The combined stream of gasoline, carbon and fuel oil is passed through a mixing valve and then heated to a temperature of 400° F. The heated stream is passed into a flash drum where the gasoline is vaporized and separately withdrawn. The gasoline vapors are condensed and recycled in contact with additional scrubbing water for the removal of carbon therefrom. The flash drum residue comprising a slurry of carbon suspended in bunker fuel oil is passed to the synthesis gas generator to provide the fuel charged thereto.

Obviously, many modifications and variations of the invention, as hereinbefore set forth, may be made without departing from the spirit and scope thereof, and therefore only such limitations should be imposed as are indicated in the appended claims.

I claim:

1. A method for recovering carbonaceous solid from a gas stream resulting from reaction of a carbonaceous fuel with oxygen in a reaction zone to produce a product gas stream comprising carbon monoxide, hydrogen, and entrained carbonaceous solid, which comprises contacting said product gas stream with water in a gas scrubbing zone effecting removal of said carbonaceous solid from said gas stream forming a dispersion of carbonaceous solid in water, contacting said dispersion with a liquid hydrocarbon having a gravity above 20° API effecting resolution of said dispersion into clarified water and a slurry of carbonaceous solid in said hydrocarbon, separating said slurry and said clarified water, contacting said slurry with a heavy fuel oil, vaporizing said hydrocarbon having a gravity above 20° API forming a residue slurry of carbonaceous solid in heavy fuel oil, and separately withdrawing vaporized hydrocarbon and residue slurry.

2. The process of claim 1 wherein vaporized hydrocarbon is condensed and recycled in contact with said dispersion of carbon in water.

3. The process of claim 1 wherein said heavy fuel oil is heated to a temperature effective to vaporize said hydrocarbon having a gravity above 20° API upon contacting with said slurry of carbon in hydrocarbon having a gravity above 20° API.

4. A method for recovering carbonaceous solid from a gas stream resulting from reaction of a carbonaceous fuel with oxygen in an unpacked reaction zone at an autogenous temperature within the range of about 1800 to 3500° F. and at a pressure within the range of about 100 to about 600 pounds per square inch gauge producing a hot gas stream comprising hydrogen, carbon monoxide, water vapor, and entrained carbonaceous solid, which comprises partially cooling said hot gas stream by indirect heat exchange to a temperature above its dew point, contacting the partially cooled gas stream with water in a scrubbing zone effecting separation of carbonaceous solid therefrom forming a dispersion comprising not more than about 1.0 weight percent carbonaceous solid, contacting said dispersion with a hydrocarbon liquid having a gravity above 20° API effecting resolution of said dispersion into a layer of clarified water and a floating layer of slurry of said solid in said hydrocarbon, decanting said slurry from said clarified water, passing said slurry with a heavy fuel into a vaporization zone, vaporizing at least a part of said liquid hydrocarbon having a gravity about 20° API from said slurry forming a residue slurry of solid in heavy fuel oil, and separately withdrawing hydrocarbon vapor and residue slurry.

5. A method for recovering carbonaceous solid from a gas stream resulting from reaction of a carbonaceous fuel with oxygen in a reaction zone to produce a product gas stream comprising carbon monoxide, hydrogen, and entrained carbonaceous solid, contacting said product gas stream with water in a gas scrubbing zone effecting removal of said carbonaceous solid from said gas stream forming a dispersion of carbonaceous solid in water, contacting said dispersion with a vaporizable liquid hydrocarbon selected from the group consisting of butanes, pentanes, hexanes, benzol, toluol, natural gasoline, gasoline, naphtha and gas oil effecting resolution of said dispersion into clarified water and a slurry of carbonaceous solid in said vaporizable hydrocarbon, separating said slurry and said clarified water, contacting said slurry with a heavy fuel oil, vaporizing said vaporizable hydrocarbon forming a residue slurry of carbonaceous solid in heavy fuel oil and separately withdrawing vaporized hydrocarbon and residue slurry.

6. A method for recovering carbonaceous solid from a gas stream resulting from reaction of a carbonaceous fuel with oxygen in a reaction zone to produce a product gas stream comprising carbon monoxide, hydrogen, and entrained carbonaceous solid, contacting said product gas stream with water in a gas scrubbing zone effecting removal of said carbonaceous solid from said gas stream forming a dispersion of carbonaceous solid in water, contacting said dispersion with a vaporizable liquid hydrocarbon having a gravity above 20° API effecting resolution of said dispersion into clarified water and a slurry of carbonaceous solid in said vaporizable hydrocarbon, separating said slurry and said clarified water, contacting said slurry with a heavy fuel oil at a temperature above the boiling point of said vaporizable hydrocarbon, vaporizing said vaporizable hydrocarbon forming a residue slurry of carbonaceous solid in heavy fuel oil, and separately withdrawing vaporized hydrocarbon and residue slurry.

7. A method for recovering carbonaceous solid from a gas stream resulting from reaction of a carbonaceous fuel with oxygen in a reaction zone to produce a product gas stream comprising carbon monoxide, hydrogen, and entrained carbonaceous solid, contacting said product gas stream with water in a gas scrubbing zone effecting removal of said carbonaceous solid from said gas stream forming a dispersion of carbonaceous solid in water, contacting said dispersion with a gasoline effecting resolution of said dispersion into clarified water and a slurry of carbonaceous solid in said gasoline, separating said slurry and said clarified water, contacting said slurry with a heavy fuel oil, vaporizing said gasoline forming a residue slurry of carbonaceous solid in heavy fuel oil, separately withdrawing gasoline vapor and residue slurry, condensing said gasoline vapor, recycling at least a part of said condensed gasoline in contact with said dispersion, and passing at least a part of said residue slurry to said reaction zone as said carbonaceous fuel.

8. A method for recovering carbonaceous solid from a dispersion of carbonaceous solid in water which comprises contacting said dispersion with a liquid hydrocarbon having a gravity above 20° API effecting resolution of said dispersion into clarified water and a slurry of carbonaceous solid in said liquid hydrocarbon, separating said slurry and said clarified water, contacting said slurry with a heavy fuel oil, vaporizing said hydrocarbon having a gravity above 20° API forming a residue slurry of carbonaceous solid in heavy fuel oil, and separately withdrawing vaporized hydrocarbon and residue slurry.

References Cited in the file of this patent

UNITED STATES PATENTS

| | | |
|---|---|---|
| Re. 22,454 | Weigand | Mar. 7, 1944 |
| 736,381 | Gloyner | Aug. 18, 1903 |
| 1,955,065 | Hawley | Apr. 17, 1934 |
| 2,226,532 | Hawley | Dec. 31, 1940 |
| 2,587,107 | Cade | Feb. 26, 1952 |
| 2,665,980 | Carkeek | Jan. 12, 1954 |
| 2,677,439 | Hedberg | May 4, 1954 |
| 2,746,564 | Williams | May 22, 1956 |
| 2,781,246 | Goldtrap | Feb. 12, 1957 |
| 2,793,938 | Frank | May 28, 1957 |
| 2,903,423 | Mondria et al. | Sept. 8, 1959 |

OTHER REFERENCES

Convertal Process of Cool Slurry Treatment, Bureau of Mines Information Circular 7660.

UNITED STATES PATENT OFFICE
CERTIFICATE OF CORRECTION

Patent No. 2,992,906

July 18, 1961

Frank E. Guptill, Jr.

It is hereby certified that error appears in the above numbered patent requiring correction and that the said Letters Patent should read as corrected below.

Column 6, line 66, for "about" read -- above --.

Signed and sealed this 21st day of November 1961.

(SEAL)
Attest:

ERNEST W. SWIDER
Attesting Officer

DAVID L. LADD
Commissioner of Patents

USCOMM-DC